US008891438B2

(12) United States Patent
Ahmadi

(10) Patent No.: US 8,891,438 B2
(45) Date of Patent: Nov. 18, 2014

(54) PACKET-DATA NETWORK AND METHODS FOR RAN-AGNOSTIC MULTIMEDIA CONTENT DISTRIBUTION

(75) Inventor: Sassan Ahmadi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 551 days.

(21) Appl. No.: 12/975,591

(22) Filed: Dec. 22, 2010

(65) Prior Publication Data

US 2012/0057457 A1    Mar. 8, 2012

Related U.S. Application Data

(60) Provisional application No. 61/381,005, filed on Sep. 8, 2010.

(51) Int. Cl.

| | |
|---|---|
| H04B 7/204 | (2006.01) |
| H04W 4/00 | (2009.01) |
| H04L 5/00 | (2006.01) |
| H04W 72/04 | (2009.01) |
| H04W 12/10 | (2009.01) |
| H04L 12/707 | (2013.01) |
| H04L 12/54 | (2013.01) |
| H04W 76/02 | (2009.01) |
| H04W 28/08 | (2009.01) |
| H04L 12/26 | (2006.01) |

(52) U.S. Cl.
CPC ........... *H04L 5/0035* (2013.01); *H04W 72/042* (2013.01); *H04W 12/10* (2013.01); *H04W 76/025* (2013.01); *H04L 45/24* (2013.01); *H04W 72/0406* (2013.01); *H04W 28/08* (2013.01); H04L 43/026 (2013.01); *H04L 12/5692* (2013.01)

USPC .......................................... 370/325; 370/328

(58) Field of Classification Search
USPC ........................................................ 370/235
See application file for complete search history.

(56) References Cited

U.S. PATENT DOCUMENTS

| | | | | |
|---|---|---|---|---|
| 6,940,813 | B2 * | 9/2005 | Ruutu ........................... | 370/231 |
| 8,175,090 | B2 * | 5/2012 | Vayanos et al. ............... | 370/389 |
| 8,363,664 | B2 * | 1/2013 | Ramankutty et al. ......... | 370/401 |
| 2003/0099196 | A1 * | 5/2003 | Sebire ........................... | 370/230 |
| 2005/0136898 | A1 | 6/2005 | Shaheen et al. | |
| 2005/0213555 | A1 * | 9/2005 | Eyuboglu et al. ............. | 370/349 |

(Continued)

FOREIGN PATENT DOCUMENTS

WO    WO2012/033593 A1    3/2012

OTHER PUBLICATIONS

"International Application Serial No. PCT/US2011/047185, International Preliminary Report on Patentability mailed Mar. 21, 2013", 7 pgs.

(Continued)

*Primary Examiner* — Gerald Smarth
(74) *Attorney, Agent, or Firm* — Schwegman Lundberg & Woessner, P.A.

(57) ABSTRACT

Embodiments of a packet-data network (PDN) and methods for RAN-agnostic multimedia content distribution are generally described herein. In some embodiments, the PDN may dynamically distribute IP packets of a single service flow to two or more RANs associated with two or more available radio links for subsequent transmission to a user terminal when each of the two or more available radio links meet the QoS requirements of the single service flow.

18 Claims, 3 Drawing Sheets

(56) References Cited

U.S. PATENT DOCUMENTS

| | | |
|---|---|---|
| 2007/0053370 A1* | 3/2007 | Aghvami et al. ............ 370/401 |
| 2007/0173283 A1 | 7/2007 | Livet et al. |
| 2007/0297360 A1* | 12/2007 | Joachim et al. ............ 370/329 |
| 2008/0013553 A1 | 1/2008 | Shaheen |
| 2008/0039057 A1* | 2/2008 | Worrall et al. ............ 455/414.1 |
| 2008/0192692 A1 | 8/2008 | Chari et al. |
| 2008/0304458 A1* | 12/2008 | Aghvami et al. ............ 370/338 |
| 2009/0252134 A1* | 10/2009 | Schlicht et al. ............ 370/338 |
| 2011/0039562 A1* | 2/2011 | Balasubramanian et al. 455/436 |
| 2011/0122812 A1* | 5/2011 | Jeong et al. ............ 370/328 |

OTHER PUBLICATIONS

"International Application Serial No. PCT/2011/047185, International Written Opinion mailed Feb. 17, 2012", 5 pgs.

"International Serial Application No. PCT/US2011/047185, International Search Report mailed Feb. 17, 2012", 3 pgs.

* cited by examiner

PACKET-DATA NETWORK AND METHODS FOR RAN-AGNOSTIC MULTIMEDIA CONTENT DISTRIBUTION

PRIORITY CLAIM

This application claims priority under 35 U.S.C. §119 to U.S. Provisional Patent Application Ser. No. 61/381005, filed Sep. 8, 2010 entitled ADVANCED WIRELESS COMMUNICATION SYSTEMS AND TECHNIQUES (reference no. P36006Z).

TECHNICAL FIELD

Embodiments pertain to wireless communications. Some embodiments relate to internet-protocol (IP) flow mobility in a packet-data network (PDN). Some embodiments relate to multi-media content distribution through radio-access networks (RANs) configured in accordance with different radio-access technologies (RATs).

BACKGROUND

Single-radio mobile devices have been rapidly evolving toward multi-radio mobile devices to facilitate the use of different RATs when available. In addition, the set of applications running on these mobile devices is increasingly diversifying. While some of these applications may be well suited to run over conventional access networks, such as a 3GPP access network, other applications may be well suited to run over other access systems. In some environments (e.g., home, office, campus, etc.), it may be beneficial to exploit the multi-radio capability of mobile devices.

One issue with exploiting the multi-radio capability of mobile devices is that because of the restrictions in access network specifications (such as 3GPP Evolved Universal Terrestrial Radio Access Network (E-UTRAN) Rel-8 (Evolved Packet System (EPS)), a mobile device may not able to access the same PDN via multiple access network interfaces simultaneously. Although a mobile terminal may be able to establish a single PDN connection or multiple simultaneous PDN connections, all the traffic exchanged by the mobile device, regardless of which PDN connection it belongs to, is routed through the same access network. Individual IP flows within a PDN connection cannot be treated separately. This inhibits the full exploitation of the multi-radio capabilities of a mobile device, which would be particularly beneficial for multi-media content distribution.

Thus, what is needed is a PDN and method for RAN-agnostic content distribution that allows a mobile device to more fully exploit its multi-radio capabilities. What is also needed is a PDN that can dynamically direct IP packets of service flows generated by different applications and belonging to the same PDN connection to available RATs. Also needed is a PDN that can dynamically allocate IP packets of different service flows across different RANs to enhance the user experience while optimizing the connectivity cost for network operators.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The following abbreviations are used herein: Evolved Universal Terrestrial Radio Access Network (E-UTRAN), Long-Term Evolution (LTE), 3rd Generation Partnership Project (3GPP), Worldwide Interoperability for Microwave Access (WiMAX), Wireless Local Area Network (WLAN), Orthogonal Frequency Division Multiplexed (OFDM), Orthogonal Frequency Division Multiple Access (OFDMA), Code Division Multiple Access (CDMA), Multiple-Input Multiple Output (MIMO), Multi-User MIMO (MU-MIMO), Single-User MIMO (SU-MIMO), Radio-Access Technology (RAT), Radio-Access Network (RAN), Wireless Fidelity (WiFi), Institute of Electrical and Electronics Engineers (IEEE).

Figure 1:
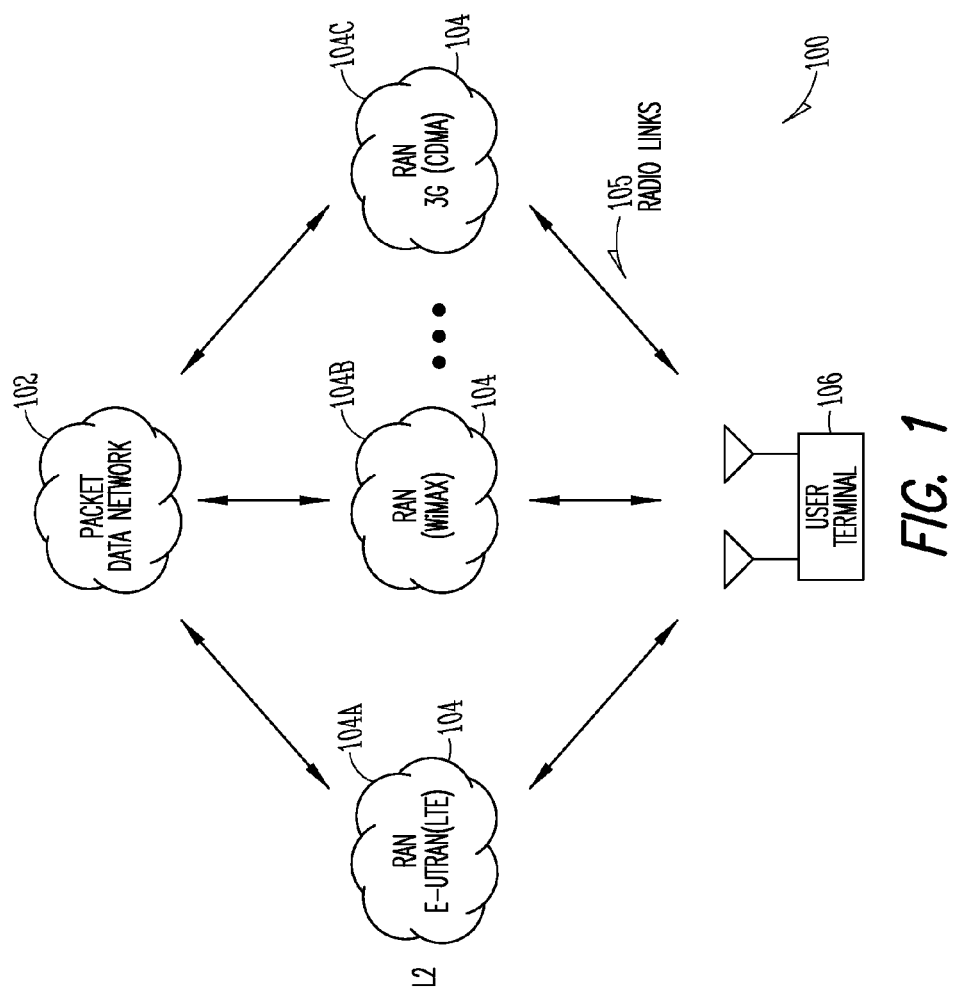
FIG. 1 illustrates a communication network, in accordance with some embodiments.

FIG. 1 illustrates a communication network in accordance with some embodiments. Communication network 100 may include one or more packet-data networks (PDNs), such as PDN 102, and a plurality of RANs 104. RANs 104 may include base stations for communicating with user terminals, such as user terminal (UT) 106, over radio links 105. Each RAN 104 may utilize a single radio-access technology (RAT). In the example illustrated in FIG. 1, each RAN 104 utilizes a different RAT, although this is not a requirement.

In accordance with embodiments, the PDN 102 may be configured for performing RAN-agnostic content distribution. In these embodiments, the PDN 102 may dynamically direct individual service flows generated by different applications and belonging to the same PDN connection to available radio links 105 of the different RANs 104. This may allow a user terminal 106 to more fully exploit its multi-radio capabilities. The PDN 102 may also dynamically allocate different service flows to different RANs 104 based on the quality-of-service (QoS) requirements of the different service flows. Accordingly, the user experience may be enhanced while the connectivity cost for network operators may be reduced. Furthermore, when handing over from one RAN 104 to another, all service flows within a PDN connection do not need to be all moved together, as is the case with many conventional PDNs. These various embodiments are described in more detail below.

In accordance with some embodiments, the PDN 102 may be configured to distribute IP packets of a single service flow to two or more RANs 104 associated with two or more available radio links 105 for subsequent transmission to the user terminal 106 when each of the two or more available radio links 105 meet the QoS requirements of the single service flow. Accordingly, more than one RAN 104 may be used, for example, to distribute the multimedia content of a single service flow. More than one RAN 104 may also be used to distribute the service flows of a single PDN connection. These embodiments are described in more detail below.

In some embodiments, layer-3 IP packets associated with multimedia content, such as video streaming or internet access, may be scheduled for a particular user with several radio connections with the network. These layer-3 packets may be distributed across any of the available radio links 105 which meet the QoS requirements of the service being provided.

In some embodiments, IP session establishment and maintenance are agnostic to the layer-2 connections of the RANs 104. The PDN 102 may be configured to perform IP packet distribution and collection operations to enable fast switching between the sustainable connections that may be transparent to the upper layers. The PDN 102 may utilize channel quality measurement information, channel state/quality reporting, control-signaling information, and connection-switching trigger operations, among other information that may be obtained from the RANs 104. The layer-2 handover mechanisms across RANs 104 may be configured to be low-latency and efficient so that any inter-RAT handover latency may be effectively zero. These embodiments are distinguishable from IP-mobility operations in which the IP address of a mobile device is maintained as the mobile device roams across different access networks and cells.

In some embodiments, a more efficient use of the available radio links 105 may be achieved which may result in an improvement in performance and an improvement in application throughput. Furthermore, loads on congested RANs 104 may be balanced based on the availability, operating conditions, and coverage of the different RANs 104 that are available to user terminals.

In the example illustrated in FIG. 1, RANs 104 may include one or more E-UTRAN configured RANs, such as RAN 104A (i.e., a 3GPP LTE RAN using an OFDMA technology), one or more WiMAX configured RANs, such as RAN 104B (using an OFDMA technology), and one or more 3G configured RANs, such as RAN 104C (i.e., using a 3G CDMA technology). RANs 104 may also include other RANs (not separately illustrated), such as RANs that use WiFi or WLAN communication techniques (e.g., in accordance with one of the IEEE 802.11 standards), including SU-MIMO and MU-MIMO communication techniques, in accordance with IEEE 802.11 task group ac. Each RAN 104 may utilize different radio links 105 for communicating with user terminals, such as user terminal 106.

In some embodiments, based on the QoS information for available radio links 105, the PDN 102 may distribute the IP packets of the service flows across the RANs 104 according to minimum QoS requirements of the service flows to maximize an overall data packet throughput for the service flows. These embodiments are also described in more detail below. In some embodiments, when at least one of the available radio links that meet the QoS requirements of a service flow is associated with a RAN that uses a WLAN radio-access technology, the PDN 102 may be configured to maximize the use of that one available link. In this way, traffic may be offloaded from a cellular system (such as a LTE, WiMAX or 3G configured RAN) to a WiFi configured access network (i.e., a WLAN).

Figure 2:
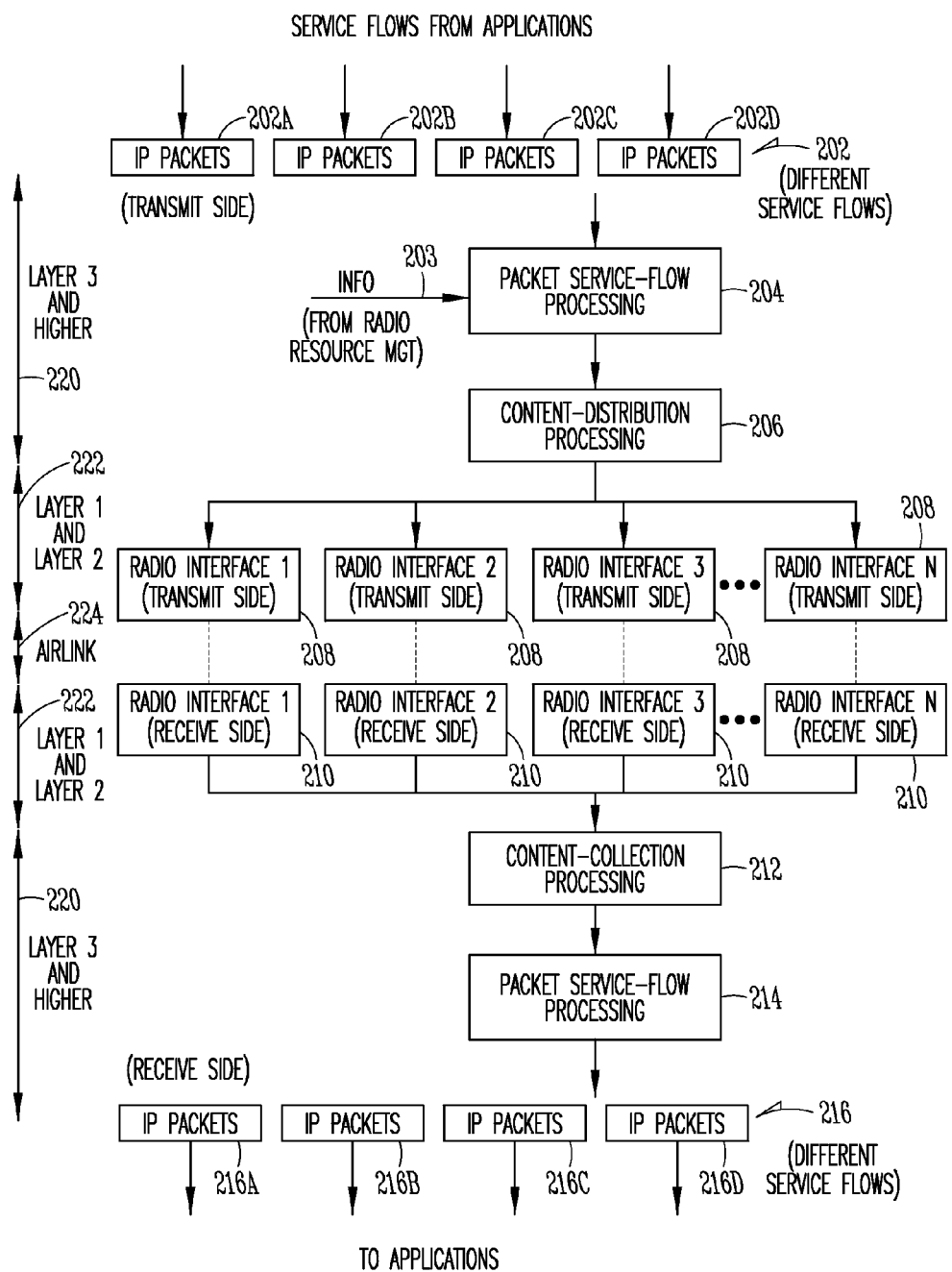
FIG. 2 illustrates the communication of IP packets of various service flows, in accordance with some embodiments.

FIG. 2 illustrates the communication of IP packets of various service flows, in accordance with some embodiments. On the transmit side, IP packets from different service flows 202 (e.g., service flows 202A through 202D) may be received at the network layer 220 (e.g., L3) of the PDN 102 (FIG. 1). Each of the different service flows 202 may be associated with a single PDN connection established for a single user terminal, such as user terminal 106 (FIG. 1).

The network layer 220 of the PDN 102 may include service-flow processing block 204 to perform operations (e.g., packet sequencing, packet classification and/or QoS enforcement operations) on the IP packets from the different service flows 202. The network layer 220 of the PDN 102 may also include a content-distribution processing block 206 for distributing the IP packets of the service flows 202 to transmit-side radio interfaces 208. The transmit-side radio interfaces 208 may be at the radio-link layer 222 (e.g., L2) and may be associated with different RANs 104 (FIG. 1). The transmit-side radio interfaces 208 may utilize different radio links 105 (FIG. 1) to transmit IP packets to user terminals, such as user terminal 106.

On the receive side, receive-side radio interfaces 210 at the radio-link layer 222 may receive IP packets of various service flows from user terminals, such as user terminal 106. The receive-side radio interfaces 210 may also be associated with different RANs 104. The PDN 102 may include a content-collection processing block 212 to collect IP packets of various service flows from the receive-side radio interfaces 210, and a receive-side service-flow processing block 214 to perform operations (e.g., packet sequencing, duplicate detection and removal, and jitter mitigation operations, among other things) to generate one or more different service flows 216 of a PDN connection. The IP packets of the different service flows 216 (i.e., service flows 216A through 216D) may be provided to different applications at the applications layer.

The base stations of each RAN 104 may include both a transmit-side radio interface 208 and a receive-side radio interface 210. RANs 104 may be operated by the same or different network operators. For RANs 104 that are operated by the same network operator, the functions of processing blocks 204, 206, 212 and 214 may lie between the common IP layer associated with one or multiple RATs and the packet data convergence protocols or convergence sub-layers of individual radio links. For RANs 104 that are operated by different network operators, the functions of processing blocks 204, 206, 212 and 214 may lie outside of the access network protocols and may reside in a common core network, such as the PDN 102 as described in the examples herein.

In some embodiments, processing blocks 204 and 206 may receive and use information and statistics (e.g., information 203) for particular radio links 105 that may include the availability of a radio link 105, the quality of a radio link 105, the maximum sustained data rate over a radio link 105, the reliability of a radio link 105, the maximum delay over a radio link 105, and the maximum radio resource size that can be allocated over a radio link 105. Other information and statistics may also be received and used by processing blocks 204 and 206 for distributing IP packets of a service flow 202 to different RANs 104. In some embodiments, the quality and reliability of radio links 105 may be assessed based on the long-term or short-term average probability of error over a corresponding radio link. Based on the information and statistics received, the content-distribution processing block 206 may be configured to determine an amount of data that can be routed through each available radio link 105. In some embodiments, higher-capacity and more-reliable radio links 105 may be assigned more IP packets than lower-capacity and less-reliable radio links 105.

The content-distribution processing block 206 may include a queue to store IP packets until they are successfully received and acknowledged. In some embodiments, IP packets of higher priority and delay-sensitive service flows 202 may be routed through lower-delay and more reliable radio links 105. IP packets of lower-priority and less delay-sensitive service flows 202 may be routed through higher-delay and less-reliable radio links 105.

In some embodiments, once the IP packets of the service flows 202 are distributed to different RANs 104 for transmission across the available radio links 105 based on the above-described criteria, the IP packets may be independently transmitted over airlinks 224. Airlinks 224 may correspond to radio links 105 (FIG. 1). Retransmission request operations, such as automatic-request retransmissions (ARQ) or hybrid-ARQ (HARQ), as well as link-specific error detection, correction, and recovery operations may be performed at layer 2 (e.g., in accordance with an associated air-interface protocol for the RAN 104).

At the receive side, IP packets may be delivered by the receive-side radio interfaces 210 of the RANs 104 implementing various radio access technologies to processing blocks 212 and 214 operating at the network layer 220. Service-flow processing block 214 may queue the received IP packets and arrange them based on a packet sequence number and may mitigate any jitter caused by the varying transmission time over the different radio links 105. The depth of the jitter buffer may be longer than the maximum one-way transmission delay over the available radio links. In these embodiments, any IP, user-datagram protocol (UDP), real-time transport protocol (RTP) and IP/transmission-control protocol (IP/TCP) header compression schemes operating on different radio links 105 are not significantly impacted since these header compression schemes utilize static and dynamic fields of the headers of the IP packets that are routed through a particular radio link. In accordance with embodiments disclosed herein, packets are not duplicated across the different RANs 104, but distributed to different RANs 104. In other words, the radio links 105 of more than one RAN 104 are used simultaneously to communicate different IP packets of a single service flow 202.

Figure 3:
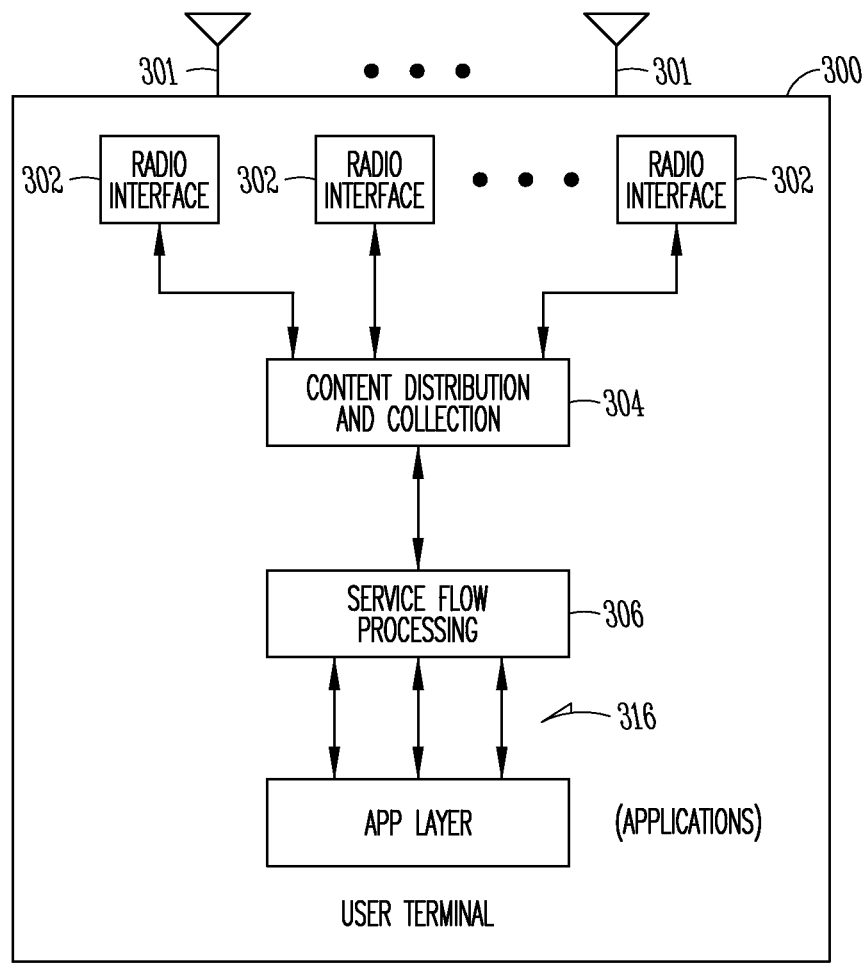
FIG. 3 is a functional block diagram of a user terminal, in accordance with some embodiments.

FIG. 3 is a functional block diagram of a user terminal, in accordance with some embodiments. User terminal 300 may be suitable for use as user terminal 106 (FIG. 1) and may include one or more antennas 301 for communicating over radio links 105 (FIG. 1) with RANs 104 (FIG. 1). User terminal 300 may also include a plurality of radio interfaces 302. Each radio interface 302 may be configured for communicating using a different RAT. For example, user terminal 300 may include radio interfaces 302, for example, to communicate using an OFDMA technology in accordance with a WiMAX standard, an OFDMA technology in accordance with a 3GPP-LTE standard, a CDMA technology in accordance with a 3G standard, and/or a WLAN technology (e.g., OFDM, CDMA, or CSMA/CA) in accordance with one of the WLAN standards.

User terminal 300 may also include a processing block 304 for content collection and content distribution, and a processing block 306 for IP service-flow processing. Processing block 306 may receive IP packets from several service flows 316 associated with different applications from application (APP) layer for subsequent transmission over radio links 105 of different RANs 104. Processing block 306 may also provide IP packets of different service flows associated with different applications to the application layer that were received over radio links 105 of different RANs 104. Processing block 304 may be configured to perform content distribution and collections operations similar to those of processing blocks 206 and 212 (FIG. 2). Processing block 306 may be configured to perform service-flow processing operations similar to those performed by service-flow processing blocks 204 and 214 (FIG. 2).

In accordance with embodiments, the user terminal 300 may be configured to transmit IP packets of a single service flow over two or more available radio links (105) to two or more RANs 104. The user terminal 300 may be configured to receive the IP packets of a single service flow over the two or more available radio links 105 associated with the two or more RANs 104 and combine the IP packets back into the single service flow corresponding to the single service flow that was distributed to the two or more RANs 104 by the PDN 102 (FIG. 2). Accordingly, the multi-radio capability of user terminal 300 may be exploited.

Antennas 301 may comprise one or more directional or omnidirectional antennas, including, for example, dipole antennas, monopole antennas, patch antennas, loop antennas, microstrip antennas or other types of antennas suitable for transmission of RF signals. In some MIMO embodiments, two or more antennas 301 may be used to take advantage of spatial diversity and the different channel characteristics that may result between each of antennas 301 and the antennas of one or more base stations. In some embodiments, the antennas 301 may be configured to receive signals in accordance with more than one radio-access technology.

Referring to FIGS. 1-3, the PDN 102 is configured for RAN-agnostic multimedia content distribution and may distribute IP packets of a single service flow (e.g., service flow 202C) to two or more RANs 104 for subsequent transmission to a user terminal 106 when two or more available radio links 105 meet QoS requirements of single service flow 202C. In these embodiments, a single service flow may be distributed to available radio links 105 of different RANs 104 to achieve RAN-agnostic multimedia content distribution. In some embodiments, the PDN 102 may be configured to distribute IP packets of two or more service flows 202 to available radio links 105 of the RANs 104.

In some embodiments, the service-flow processing block 204 operating at the network layer 220 may be configured to perform service-flow processing for a plurality of service flows 202 that are destined for a user terminal 106. Service-flow processing may include one or more of packet sequencing, packet classification, and QoS enforcement operations for IP packets in each of the service flows. The content-distribution processing block 206 operating at the network layer 220 may distribute the IP packets of the service flows 202 to the RANs. In some embodiments, the IP packets of at least one of the service flows 202 are distributed to two or more of the RANs 104 for transmission to a user terminal 106 over radio links 105 associated with the two or more RANs 104. In these embodiments, the RANs 104 may operate at the radio-link layer 222. As illustrated in FIG. 2, IP packets of two or more service flows 202 for a single user terminal 106 may be received at the network layer 220. Each service flow 202 may have a set of QoS requirements. For each of the service flows 202, the PDN 102 may identify available radio links 105 for communicating with a user terminal 106.

In some embodiments, the PDN 102 may be configured to receive information 203 for available radio links 105 for communicating with the user terminal 106 from the RANs 104 and determine which of the available radio links 105 meet the QoS requirements of the service flows 202 destined for the user terminal 106. The IP packets of a single service flow may be distributed to two or more RANs 104 for subsequent transmission to the user terminal 106 when two or more available radio links 105 meet the QoS requirements of the single service flow. These embodiments allow the user terminal 106 to communicate with the PDN 102 using multiple radio interfaces 302. Accordingly, packets of a single PDN connection may be routed through different RANs 104 to achieve RAN-agnostic multimedia content distribution. In some embodiments, when only a single radio link 105 meets the QoS requirements of a service flow, the IP packets of that service flow may be directed to the RAN 104 associated with that single radio link 105 for transmission over that single radio link 105.

When IP packets of a single service flow are distributed over two or more radio links 105, each of the radio links 105 may meet the QoS requirements of the single service flow. In some alternate embodiments, the QoS requirements of either one of the two or more identified available radio links 105 may be less than the QOS requirements of the single service flow 202C; however, when the two or more identified available radio links 105 are used together, their combined usage would meet the QoS requirements of the single service flow 202C.

In some embodiments, the service-flow processing block 204 may be configured to evaluate the information 203 received for the available radio links 105 from the RANs 104 and may determine which of the available radio links 105 meet the QoS requirements of the service flows 202 for the user terminal 106. In some embodiments, the information 203 for the available radio links 105 may be received from each of the RANs 104 from a radio-resource manager of the RANs 104.

In some embodiments, the PDN 102 may be configured to request the QoS information for the available radio links 105 for communicating with the user terminal 106 from the radio-resource manager of the RANs 104. In these embodiments, the radio-resource managers of the RANs 104 may be configured to provide the QoS information of the available radio links 105 for communicating with the user terminal 106 to the packet data network 102. The minimum QoS requirements of a service flow 202 or associated application may include, for example, a maximum tolerable latency, a maximum tolerable jitter, and a minimum data rate. Each radio link 105 that is determined to be acceptable for a service flow 202 should meet at least the minimum QoS parameters for that service flow or its associated application.

In some embodiments, the PDN 102 may be configured to receive updated QoS information for available radio links 105 for communicating with the user terminal 106 from each of the RANs 104. The PDN 102 may also be configured to dynamically reallocate the IP packets of one or more service flows 202 to the available radio links 105 based on the updated QOS information to at least maintain the QoS requirements of the service flows for a user terminal 106. When two or more available radio links 105 each meet the QoS requirements of a single service flow, radio links 105 of at least two of the RANs 104 may be allocated to the single service flow. This dynamic allocation of radio links of different RANs to individual service flows may further enhance the user experience.

The PDN 102 may also be configured to sequence the IP packets of each service flow prior to distribution to two or more RANs 104. In these embodiments, the IP packets may be sequenced and numbered by the service-flow processing block 204 to facilitate routing of the packets across different radio links 105 for later collection of the packets and jitter management at the receiver side by the receive-side service-flow processing block 214. In these embodiments, the IP address of the source and destination is not changed and remains the same regardless of which RAN 104 that the IP packets are routed through.

In some embodiments, IP/UDP/RTP or IP/TCP protocols are used over the data-planes of the different radio interfaces 208 and 210. Since the checksum sequences in UDP and TCP headers are calculated based on the application layer payloads, a sequence number inserted within the IP packets would break these existing protocols. In some embodiments, the sequence number and the timestamp of an IP packet's RTP header may be used to identify the IP packets of a service flow and to calculate the jitter over different radio links 105. In some embodiments, an RTP/TCP header sequence number or an RTP sequence number may be used to combine packets of a single service flow. IPv4, IPv6, and UDP headers do not carry a sequence number and are not used to combine packets of a single service flow.

In some embodiments, a sequence number (e.g., 32-bit number) of a TCP header may be used to arrange the IP packets of a service flow and to detect lost or late packets at the receiver side. Depending on the type of the IP packet (i.e., IP/UDP/RTP, IP/TCP, etc.) a sequence number of either the RTP or the TCP header may be used for sequencing the IP packets, although the scope of the embodiments is not limited in this respect.

Although the processing blocks 204, 206, 212 and 214 of the network layer 220 are illustrated as separate functional elements, one or more of these functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functions of the processing blocks 204, 206, 212 and 214 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the processing blocks 204, 206, 212 and 214 may include one or more processors and may be configured with instructions stored on a computer-readable storage device.

User terminal 106 may be any portable wireless communication device with multi-radio capability including a personal digital assistant (PDA), a laptop or portable computer with wireless communication capability, a smart phone, a web tablet, a wireless headset, a pager, an instant messaging device, a digital camera, an access point, a television, a medical device (e.g., a heart rate monitor, a blood pressure monitor, etc.), or other device that may receive and/or transmit information wirelessly.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A packet-data network (PDN) configured for RAN-agnostic multimedia content distribution, the PDN configured to:

receive QoS information for available radio links from a first set and a second set of separate radio links from two or more radio-access networks (RANs) wherein the first set of separate radio links include a first and a second separate radio link for providing communication between the PDN and the two or more RANs and wherein the second set of separate radio links include a first and a second separate radio link for providing communication between the one or more RANs and the user terminal;

determine which of the available radio links from the first and second set of separate radio links meet a quality-of-service (QoS) requirements for a single transmit service flow destined for the user terminal ; and distribute interne-protocol (IP) packets of the single transmit service flow to two or more radio-access networks (RANs) via the first set of separate radio links for subsequent transmission to the user terminal for combining by the user terminal using the second set of separate radio links when the first and second set of separate radio links meet OoS requirements of the single transmit service flow.

2. The PDN of claim 1, wherein the PDN includes:
a service-flow processing block operating at a network layer that is configured to perform service-flow processing for a plurality of service flows destined for the user terminal, the service-flow processing including one or more of packet sequencing, packet classification, and QoS enforcement operations for IP packets of each of the plurality of transmit service flows; and
a content-distribution processing block operating at the network layer to distribute the IP packets of the transmit service flow to the two or more RANs, wherein, for at least one of the plurality of service flows, the IP packets are distributed to two or more of the RANs for transmission to the user terminal over the second set of separate radio links associated with the two or more RANs.

3. The PDN of claim 1, wherein, based on the QoS information for available radio links from the first and second set of separate radio links, the PDN is further configured to distribute the IP packets of the plurality of service flows across the two or more RANs according to minimum QoS requirements of the plurality of service flows to maximize an overall data packet throughput for the plurality of service flows.

4. The PDN of claim 1, wherein when one or more of the available radio links from the first and second set of separate radio links that meet the QoS requirements of the single service flow is associated with one or more of the RANs that use a wireless local area network (WLAN) radio-access technology, the PDN is configured to maximize the use of the one or more of the available radio links from the first and second set of separate radio links that meet the QoS requirements.

5. The PUN of claim 1, wherein the user terminal is configured to receive the IP packets of the single transmit service flow over the available radio links from the first and second set of separate radio links associated with the two or more RANs and combine the received IP packets into a combined service flow corresponding to the single service flow that was distributed to the two or more RANs by the PDN.

6. The PDN of claim 5, further configured to:
receive updated QoS information for the available radio links from the first and second set of separate radio links for communicating with the user terminal from each of the two or more RANs; and
dynamically reallocate the IP packets of the single service flow to the available radio links from the first and second set of separate radio links based on the updated QOS information to at least maintain the QoS requirements of each of the single service flow,
wherein when two or more of the available radio links from the first and second set of separate radio links each meet the QoS requirements of the single service flow, the radio links of at least two of the two or more RANs are allocated to the single service flow.

7. The PDN of claim 5,
wherein the service-flow processing block is configured to evaluate the QoS information for the available radio links from the first and second set of separate radio links to determine whether at least one of the available radio links from the first and second set of separate radio links meets the QoS requirements of the single service flow.

8. The PDN of claim 1. wherein the PDN is further configured to sequence the IP packets of the single transmit service flow prior to distribution to the two or more RANs.

9. The PDN of claim 1, further comprising:
a content-collection processing block to collect IP packets associated with the single service flow received from the user terminal from the two or more RANs; and
a receive-side service-flow processing block configured to generate the single service flow from the collected IP packets.

10. The PDN of claim 1, wherein the two or more RANs utilize different radio-access technologies; and
wherein the different radio-access technologies include two or more selected from the group of radio-access technologies consisting of an OFDMA technology in accordance with a WiMAX standard, an OFDMA technology in accordance with a 3GPP-LTE standard, a CDMA technology in accordance with a 3G standard, or a WiFi technology in accordance with a WLAN standard.

11. The PDN of claim 1, wherein the PDN is configured
to distribute IP packets of higher priority and more delay-sensitive service flows to lower-delay and more reliable radio links of the first and second set of separate radio links and to distribute IP packets of lower-priority and less delay-sensitive service flows to higher-delay and less-reliable radio links of the first and second set of separate radio links; and
wherein the PDN is further configured to assign more of the IP packets of a service flow to the higher capacity and more reliable radio links of the first and second set of separate radio links than to lower-capacity and less-reliable radio links of the first and second set of separate radio links.

12. A method performed by a packet-data network (PDN) for RAN-agnostic multimedia content distribution, the method comprising:
receiving QoS information for available radio links from a first set and a second set of separate radio links from two or more radio-access networks (RANs), wherein the first set of separate radio links include a first and a second separate radio link for providing communication between the PDN and the two or more RANs and wherein the second set of separate radio links include a first and a second separate radio link for providing communication between the one or more RANs and the user terminal:

determining which of the available radio links from the first and second set of separate radio links meet a quality-of-service (QoS) requirements for a single transmit service flow destined for the user terminal; and distributing internet-protocol (IP) packets of the single transmit service flow to two or more of the RANs via the first set of separate radio links for subsequent transmission to the user terminal for combining by the user terminal using the second set of separate radio links when the first and second set of separate radio links meet QoS requirements of the single transmit service flow.

13. The method of claim 12 wherein based on the QoS information for radio links available from a first set of separate radio links and a second set of separate radio links associated with each of the two or more RANs, the method further includes distributing the IP packets of the single service flow across the RANs according to minimum QoS requirements of the single transmit service flow to maximize an overall data packet throughput for the single transmit service flow.

14. The method of claim 12
wherein the method further comprises evaluating the QoS information for the radio links available from a first set of separate radio links and a second set of separate radio links to determine whether at least one of the radio links available from a first set of separate radio links and a second set of separate radio links at least meets the QoS requirements of the single service flow, and
wherein the method further comprises:
receiving updated QoS information for radio links available from a first set of separate radio links and a second set of separate radio links for communicating with the user terminal from each of the two or more RANs; and
dynamically reallocating the IP packets of the the single service flow to the radio links available front a first set of separate radio links and a second set of separate radio links based on the updated QOS information to at least maintain the QoS requirements of the single service flow,
wherein when two or more of the radio links available from a first set of separate radio links and a second set of separate radio links meet the QoS requirements of the single service flow, the radio links of at least two of the two or more RANs are allocated to the single service flow.

15. The method of claim 12, wherein distributing comprises:
distributing IP packets of higher priority and more delay-sensitive service flows to lower-delay and more reliable radio links of the first and second set of separate radio links, and
distributing IP packets of less delay-sensitive service flows to higher-delay and less-reliable radio links of the first and second set of separate radio links,
wherein the method further comprises assigning more of the IP packets of a service flow to the higher capacity and more reliable radio links of the first and second set of separate radio links than to lower-capacity and less-reliable radio links of the first and second set of separate radio links.

16. A multi-radio user terminal comprising:
processing circuitry; and
a plurality of radio interfaces, each of the plurality of radio interfaces configured to communicate with two or more radio-access networks (RANs) to receive OoS information for available radio links from a first set and a second set of separate radio links from the two or more RANs, wherein the first set of separate radio links include a first and a second separate radio link for providing communication between the PDN and the two or more RANs and wherein the second set of separate radio links include a first and a second separate radio link for providing communication between the one or more RANs and the user terminal and the processing circuitry arranged to determine which of the available radio links from the first and second set of separate radio links meet a quality-of-service (QoS) requirements for a single transmit service flow destined for the user terminal;
wherein the plurality of radio interfaces are configured to receiver IP packets of the single transmit service flow to two or more radio-access networks (RANs) via the first set of separate radio links for subsequent transmission to the user terminal;
wherein the processing circuitry is configured to combine using the second set of separate radio links when the first and second set of separate radio links meet QoS requirements of the single transmit service flow.

17. The multi-radio user terminal of claim 16, wherein the processing circuitry is further configured to distribute IP packets received from an application layer to the plurality of radio interfaces for transmission over available radio links from the first and second set of separate radio links to two or more RANs to a packet-data network (PDN).

18. The multi-radio user terminal of claim 17, wherein the user terminal is configured to combine the received IP packets back into the single service flow based on a sequence number and a timestamp of an IP packet's real-time transport protocol (RTP) header.

* * * * *

UNITED STATES PATENT AND TRADEMARK OFFICE
CERTIFICATE OF CORRECTION

| | |
|---|---|
| PATENT NO. | : 8,891,438 B2 |
| APPLICATION NO. | : 12/975591 |
| DATED | : November 18, 2014 |
| INVENTOR(S) | : Sassan Ahmadi |

It is certified that error appears in the above-identified patent and that said Letters Patent is hereby corrected as shown below:

In the claims

In column 9, line 9, in Claim 1, delete "fbr" and insert --for--, therefor

In column 9, line 9, in Claim 1, delete "terminal ;" and insert --terminal;--, therefor In column 9, line 10, in Claim 1, delete "interne" and insert --internet--, therefor In column 9, line 16, in Claim 1, delete "OoS" and insert --QoS--, therefor In column 9, line 49, in Claim 5, delete "PUN" and insert --PDN--, therefor In column 10, line 11, in Claim 8, delete "1." and insert --1,--, therefor In column 10, line 58, in Claim 12, delete "terminal:" and insert --terminal;--, therefor In column 11, line 10, in Claim 13, delete "fbr" and insert --for--, therefor In column 11, line 25, in Claim 14, delete "front" and insert --from--, therefor In column 12, line 11, in Claim 16, delete "OoS" and insert --QoS--, therefor In column 12, line 25, in Claim 16, delete "receiver" and insert --receive--, therefor Signed and Sealed this
Twenty-fourth Day of November, 2015

Michelle K. Lee
*Director of the United States Patent and Trademark Office*